United States Patent
Duan et al.

(10) Patent No.: US 8,432,677 B2
(45) Date of Patent: Apr. 30, 2013

(54) HINGE ASSEMBLY FOR FOLDABLE ELECTRONIC DEVICE

(75) Inventors: Chao Duan, Shenzhen (CN); Chia-Hua Chen, Taipei (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 182 days.

(21) Appl. No.: 12/979,091

(22) Filed: Dec. 27, 2010

(65) Prior Publication Data

US 2012/0099249 A1 Apr. 26, 2012

(30) Foreign Application Priority Data

Oct. 21, 2010 (CN) .......................... 2010 1 0514522

(51) Int. Cl.
*H05K 5/00* (2006.01)
*E05F 1/08* (2006.01)

(52) U.S. Cl.
USPC .......... 361/679.27; 361/755; 16/303; 16/325; 16/312; 16/330

(58) Field of Classification Search ............. 361/679.27, 361/755; 16/60, 53, 284, 312, 325
See application file for complete search history.

(56) References Cited

U.S. PATENT DOCUMENTS

| | | | | |
|---|---|---|---|---|
| 3,634,932 | A * | 1/1972 | Mason | 29/596 |
| 5,109,571 | A * | 5/1992 | Ohshima et al. | 16/307 |
| 6,421,878 | B1 * | 7/2002 | Kaneko et al. | 16/330 |
| 6,505,382 | B1 * | 1/2003 | Lam et al. | 16/325 |
| 6,952,860 | B2 * | 10/2005 | Kawamoto | 16/285 |
| 7,184,275 | B2 * | 2/2007 | Yamaguchi et al. | 361/755 |
| 7,814,620 | B2 * | 10/2010 | Lin et al. | 16/330 |
| 7,832,056 | B2 * | 11/2010 | Kuwajima et al. | 16/354 |
| 7,835,143 | B2 * | 11/2010 | Shi et al. | 361/679.01 |
| 7,929,285 | B2 * | 4/2011 | Shen | 361/679.21 |
| 7,936,559 | B2 * | 5/2011 | Chen | 361/679.27 |
| 7,974,666 | B2 * | 7/2011 | Kosugi et al. | 455/575.3 |
| 8,209,817 | B2 * | 7/2012 | Shen | 16/342 |
| 2005/0128719 | A1 * | 6/2005 | Yamaguchi et al. | 361/755 |
| 2006/0112515 | A1 * | 6/2006 | Konja et al. | 16/284 |
| 2006/0242795 | A1 * | 11/2006 | Duan et al. | 16/330 |
| 2006/0254026 | A1 * | 11/2006 | Duan et al. | 16/330 |
| 2007/0054710 | A1 * | 3/2007 | Pan | 455/575.3 |
| 2007/0151078 | A1 * | 7/2007 | Kim et al. | 16/325 |
| 2008/0201900 | A1 * | 8/2008 | Kubota | 16/221 |
| 2009/0021901 | A1 * | 1/2009 | Stothers | 361/681 |
| 2009/0147458 | A1 * | 6/2009 | Wang et al. | 361/679.27 |
| 2009/0154087 | A1 * | 6/2009 | Goto | 361/679.27 |
| 2011/0277274 | A1 * | 11/2011 | Duan et al. | 16/304 |

* cited by examiner

*Primary Examiner* — Adrian S Wilson
*Assistant Examiner* — Abhishek Rathod
(74) *Attorney, Agent, or Firm* — Altis Law Group, Inc.

(57) ABSTRACT

A hinge assembly includes a first cam, a second cam, a third cam, at least one resilient member and a shaft. The first cam includes an outer cam surface and an inner cam surface. The third cam is slidably received in the second cam, and the second cam and the third cam respectively engage with the outer cam surface and the inner cam surface. The resilient member provides an elastic force making the third cam and the second cam abut against the first cam. The shaft extends through the first cam, the second cam, the third cam and the at least one resilient member.

10 Claims, 7 Drawing Sheets

HINGE ASSEMBLY FOR FOLDABLE ELECTRONIC DEVICE

BACKGROUND

1. Technical Field

The present disclosure relates to hinge assemblies and, particularly, to a hinge assembly for foldable electronic devices such as mobile phones, portable computers, and so on.

2. Description of Related Art

At present, perhaps the most popular portable electronic device in the marketplace is the foldable mobile phone, which generally includes a cover section and a body section. The cover section and the body section are rotatably interconnected through a hinge assembly, for switching the telephone between an in-use position and a closed position.

One kind of hinge assembly employs a cam and a follower, which makes the cover section fold outward from the body section and then be held in an open position. The hinge assembly typically includes a cam having a concave portion, a follower having a convex portion, a shaft having a fixing end, and a spring. The cam and the follower are placed around the shaft. The spring resists the follower making the concave portion tightly contact the convex portion. This hinge assembly allows the concave portion to rotate about the convex portion by overcoming the force of the spring. However, the hinge assembly can only be opened to several preset angles, and cannot be retained at different angles to realize free stop of the hinge assembly.

Therefore, there is room for improvement within the art.

BRIEF DESCRIPTION OF THE DRAWINGS

Many aspects of the present hinge assembly can be better understood with reference to the following drawings. The components in the drawings are not necessarily drawn to scale, the emphasis instead being placed upon clearly illustrating the principles of the present hinge assembly. Moreover, in the drawings, like reference numerals designate corresponding parts throughout the several views.

DETAILED DESCRIPTION

Figure 1:
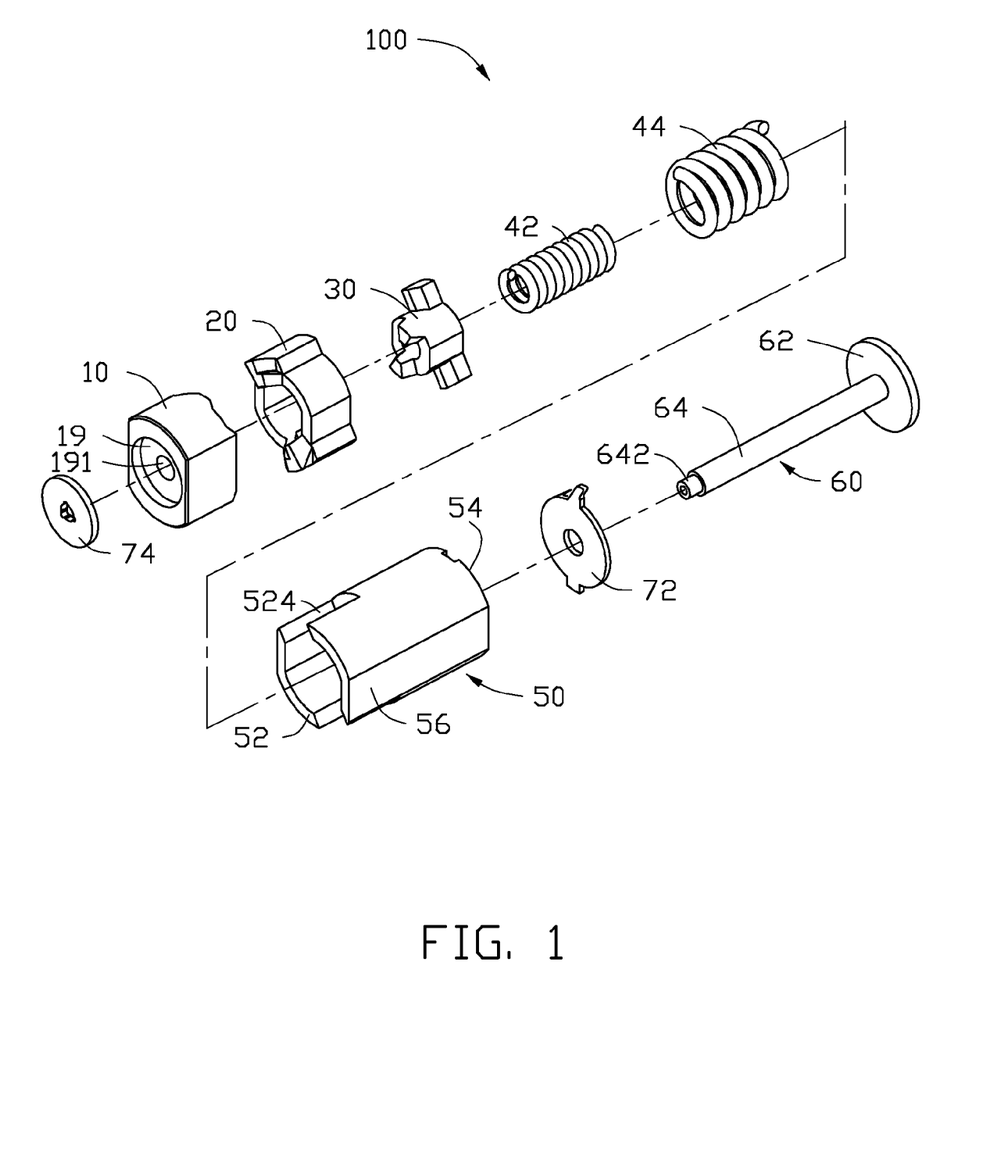
FIG. 1 is an exploded, isometric view of a hinge assembly.
Figure 2:
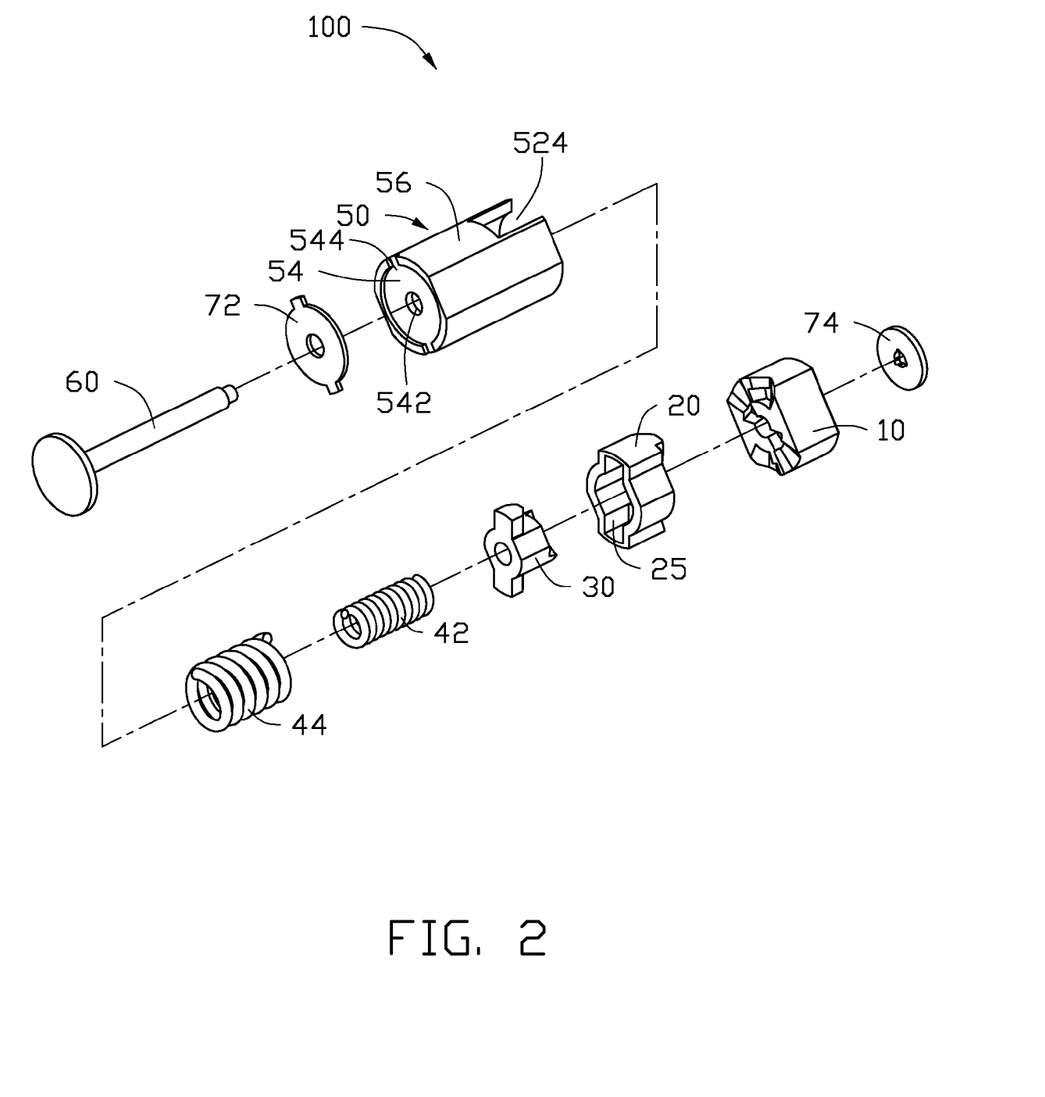
FIG. 2 is similar to FIG. 1, but shown from another aspect.

FIGS. 1 and 2 show a hinge assembly 100 according to an exemplary embodiment of the present hinge system. The hinge assembly 100 includes a first cam 10, a second cam 20, a third cam 30, a first resilient member 42, a second resilient member 44, a sleeve 50, a main shaft 60, a first washer 72, and a second washer 74.

The first cam 10 is configured for engaging with a body section of the mobile phone so that the first cam 10 and the body section cannot rotate relative to each other. The third cam 30 is slidably received in the second cam 20, and the third cam 30 and the second cam 20 are together engaged with the first cam 10. A torque curve is obtained by reading torque values at different stages of cam rotation. When two cams rotate, a torque value will be produced on a contact position. This torque curve is a sum of all point torque values. As described below, when the first cam 10 rotates relative to the second cam 20, a first torque curve is formed. As also described below, when the first cam 10 rotates relative to the third cam 30, a second torque curve is formed. Thus, the total hinge torque is the sum of the first torque curve and the second torque curve.

Figure 3:
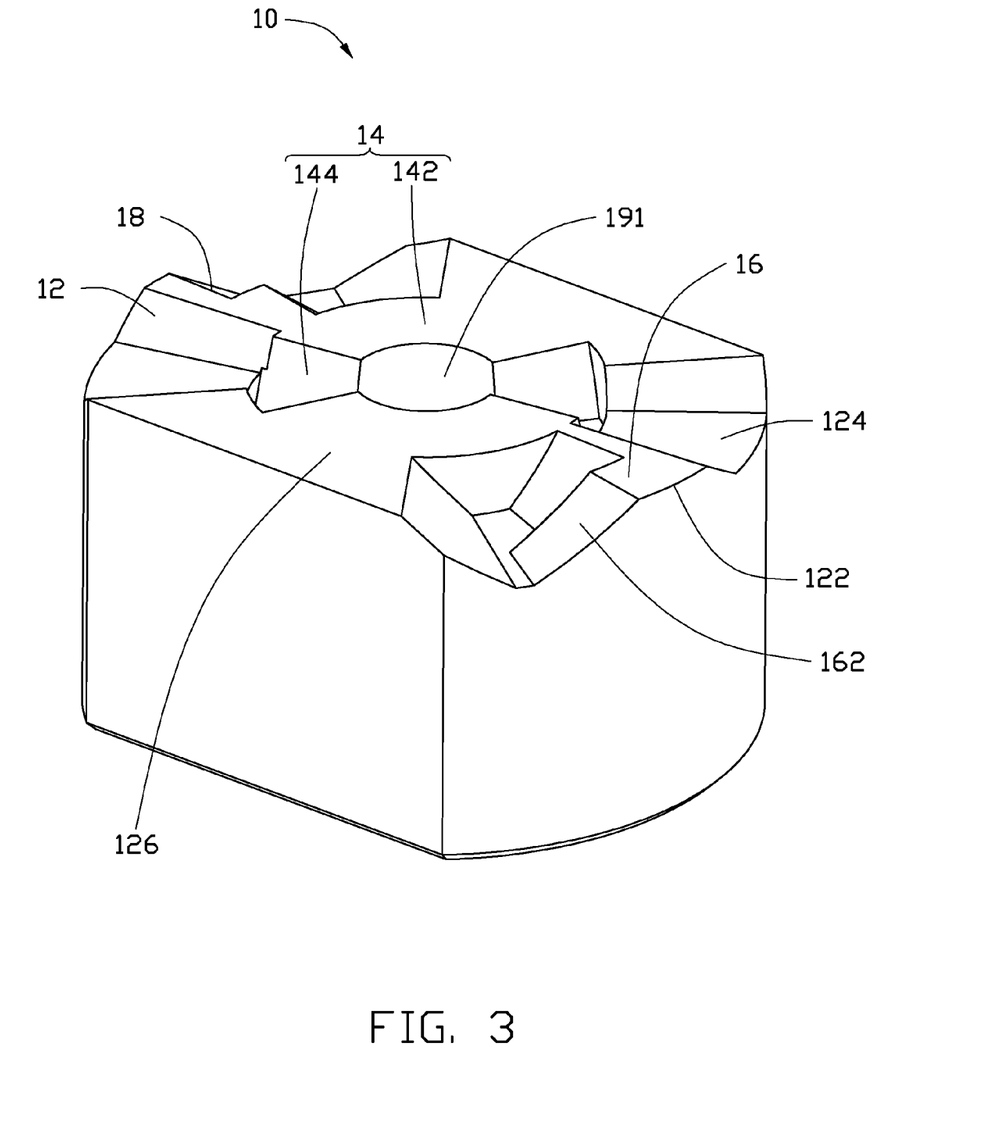
FIG. 3 is an enlarged isometric view of the first cam in FIG. 1.
Figure 4:
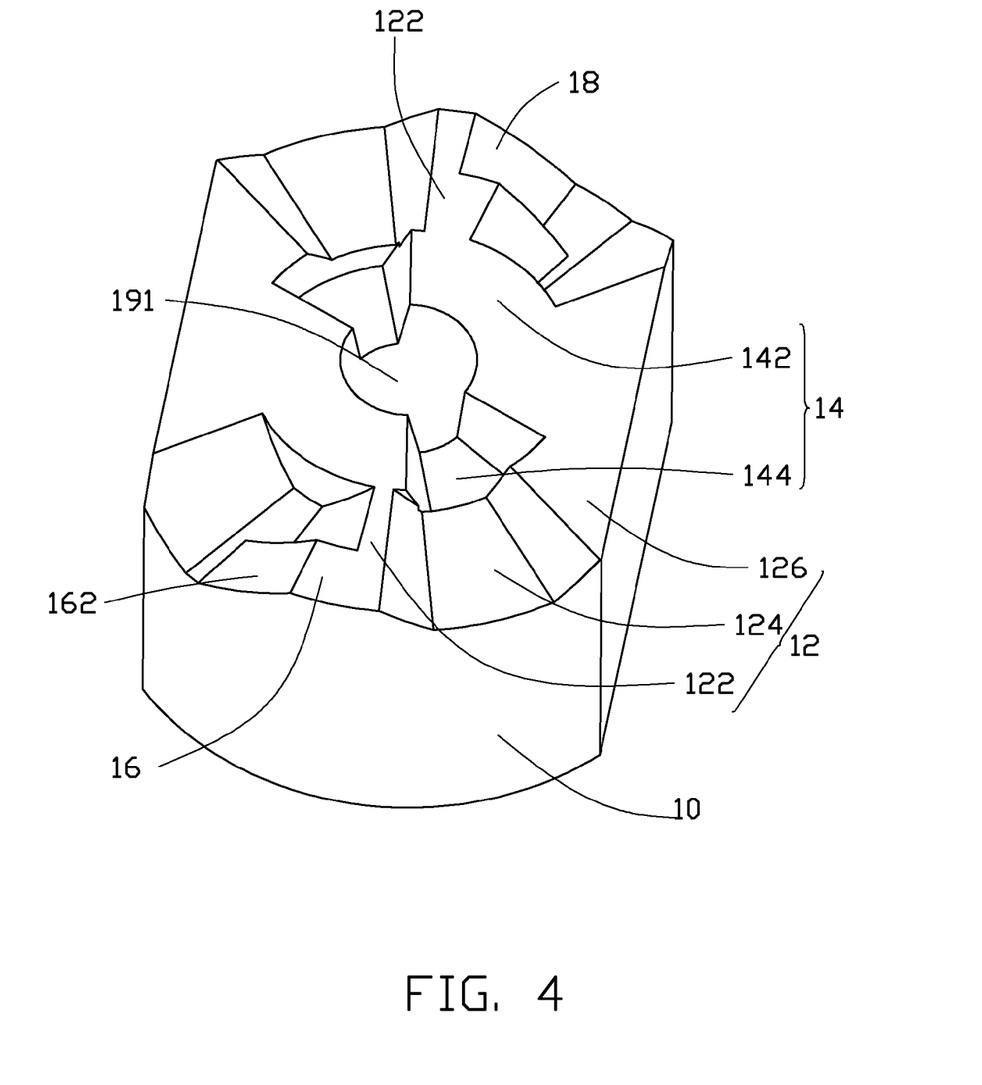
FIG. 4 is similar to FIG. 3, but shown from another aspect.

Referring to FIGS. 3 and 4, one end of the first cam 10 includes an outer cam surface 12 and an inner cam surface 14. The outer cam surface 12 includes two peaks 122, two valleys 124, and two outer planar portions 126. The inner cam surface 14 includes two inner planar portions 142 and two symmetrical grooves 144. The first cam 10 defines a circular recess 19 and axially defines a central through hole 191.

Figure 5:
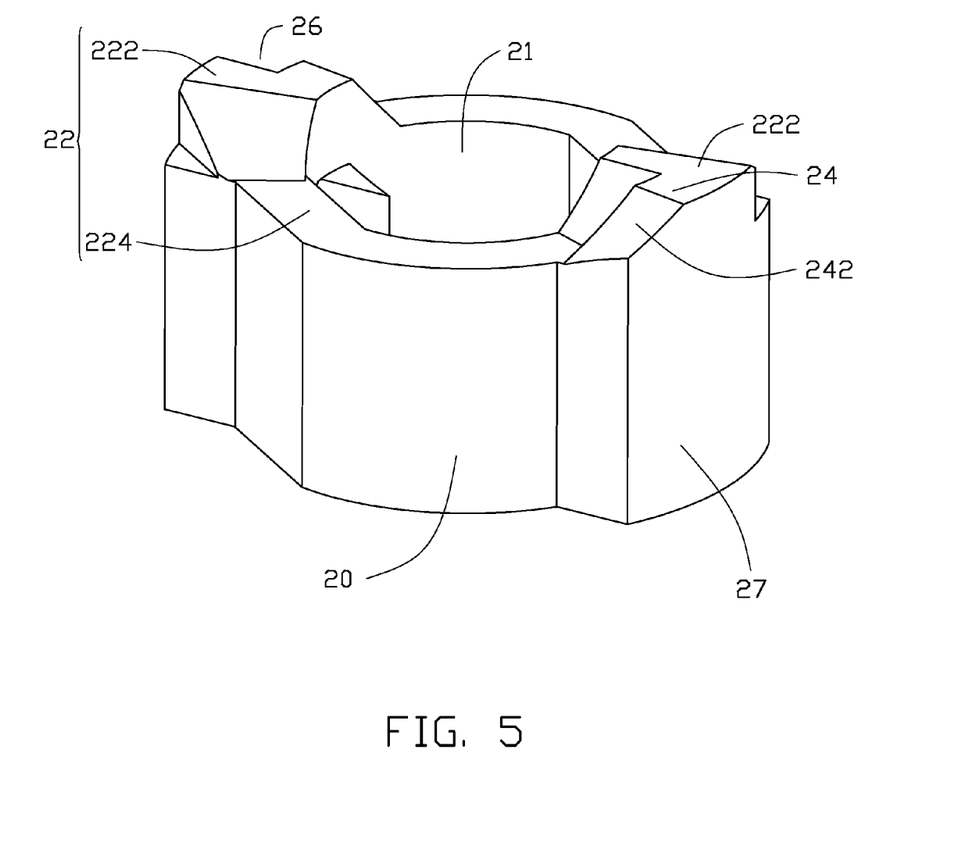
FIG. 5 is an enlarged isometric view of the second cam in FIG. 1.

Referring to FIG. 5, the second cam 20 defines a passage 21, and includes an engaging cam surface 22 at one end thereof. The engaging cam surface 22 is configured for engaging with the outer cam surface 12. The engaging cam surface 22 rotates relative to the outer cam surface 12 to form the first torque curve. In an exemplary embodiment, the engaging cam surface 22 includes two symmetrical peaks 222 and two connecting surfaces 224. The peaks 222 slide along the outer cam surface 12 to allow the second cam 20 to rotate 180 degrees relative to the first cam 10. The configuration of the connecting surfaces 224 avoids interference with the outer cam surface 12. The second cam 20 radially defines two guiding grooves 25 communicating with the passage 21. Two projections 27 are formed on a peripheral surface of the second cam 20 for engaging in the sleeve 50 so the second cam 20 is non-rotatably received in the sleeve 50.

Figure 6:
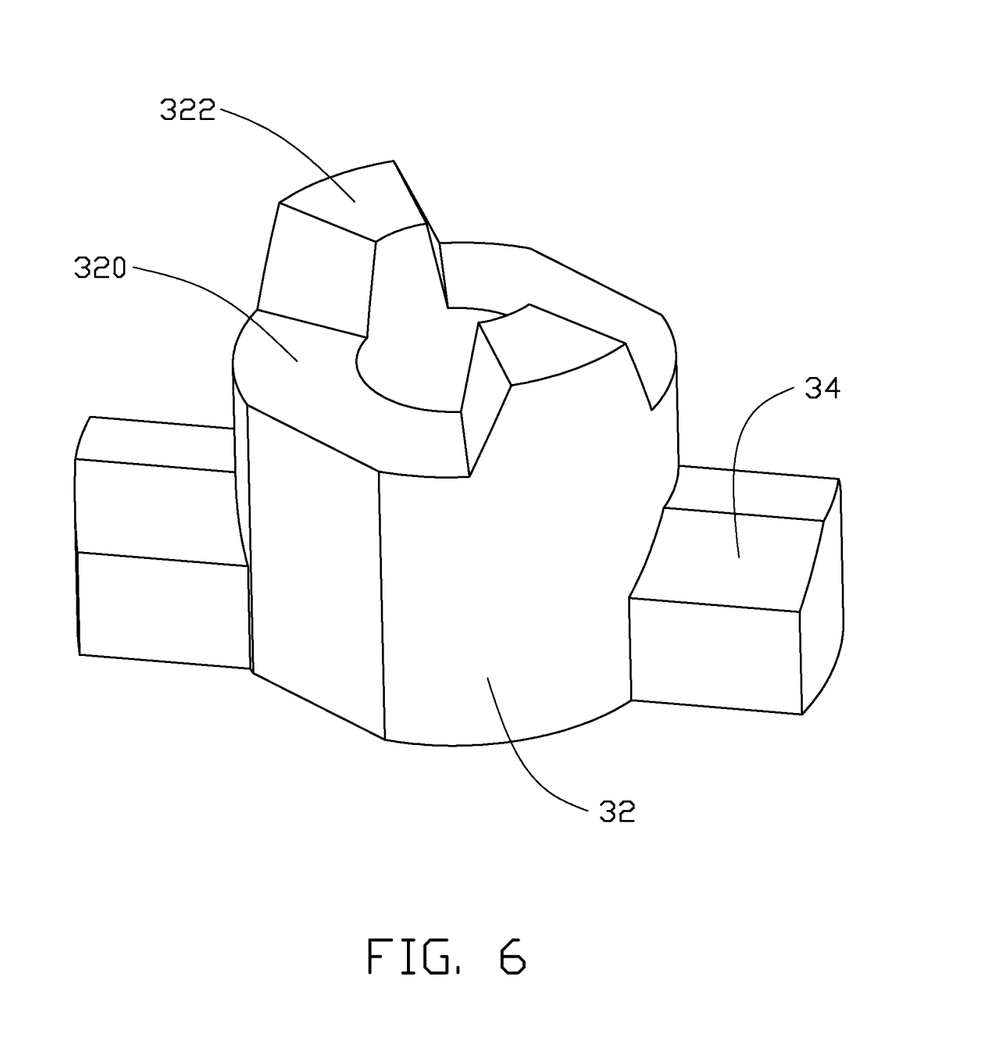
FIG. 6 is an enlarged isometric view of the third cam in FIG. 1.

Referring to FIG. 6, the third cam 30 includes a main body 32 and two blocks 34 radially extending from the main body 32. The main body 32 of the third cam 30 is slidably received in the passage 21, and the two blocks 34 are received in the guiding grooves 25. The third cam 30 includes a latching cam surface 320 for engaging with the inner cam surface 14. The latching cam surface 320 rotates relative to the inner cam surface 12 to form the second torque curve. In this exemplary embodiment, two peaks 322 are formed on the latching cam surface 320. The peaks 322 are configured for sliding from the planar portions 142 to the grooves 144. When the peaks 122 are on the planar portions 142 and the peaks 322 are on the planar portions 142, the hinge assembly may be more stably positioned at a free stop range.

In another exemplary embodiment, the configuration of the first cam 10 and the second cam 20 are changed to secure a non-clearance engagement. Referring to FIGS. 3 and 4, the first cam 10 includes a first protrusion 16 formed at one side of one peak 122, and a first notch 18 defined at one side of the other peak 122 on the outer cam surface 12. The protrusion 16 includes a resisting surface 162. Referring to FIG. 5, the second cam 20 includes a second protrusion 24 formed at one side of the peaks 222, and a second notch 26 defined in one side of the other peak 222. The second protrusion 24 includes an engaging surface 242 for engaging with the resisting surface 162. In an initial state, the first protrusion 16 is received in the second notch 26, and the second protrusion 24 is received in the first notch 16 to keep a clearance between the first cam 10 and the second cam 20 for providing an original predetermined angle. When the hinge assembly is completely opened, the first protrusion 16 abuts against the second protrusion 24 to realize a non-clearance engagement between the first cam 10 and the second cam 20. This structure avoids swaying of the hinge assembly 100.

The first resilient member 42 and the second resilient member 44 are preferably made of metal and are spiral-shaped (i.e. a coil spring). The second resilient member 42 has a larger diameter than the second resilient member 44 so that the first resilient member 42 can be received in the second resilient member 44. The first resilient member 42 abuts against the third cam 30, and the second resilient member 44 abuts against the second cam 20.

The sleeve 50 is substantially a hollow cylinder, and includes a first end 52 and a second end 54 opposite to each other. The sleeve 50 defines two guiding slots 524 at the first end 52 for receiving the projections 27. At least one flattened surface 56 is formed on an outer peripheral wall of the sleeve 50. The flat surface portions 56 are configured for engaging with a cover section of the foldable electronic device. The second end 54 defines a central hole 542 and a receiving groove 544.

The main shaft 60 coaxially includes a head portion 62 and a shaft portion 64. The shaft portion 64 extends from one end of the head portion 62 and has a smaller diameter than the diameter of the head portion 62. A free end of the shaft portion 64 has a latching portion 642.

The first washer 72 and the second washer 74 are made of a strong material, such as metal. In the exemplary embodiment, the first washer 72 is received in the receiving groove 544 of the sleeve 50. The second washer 74 is clasped on the latching portion 642, thereby mounted with the main shaft 60.

Figure 7:
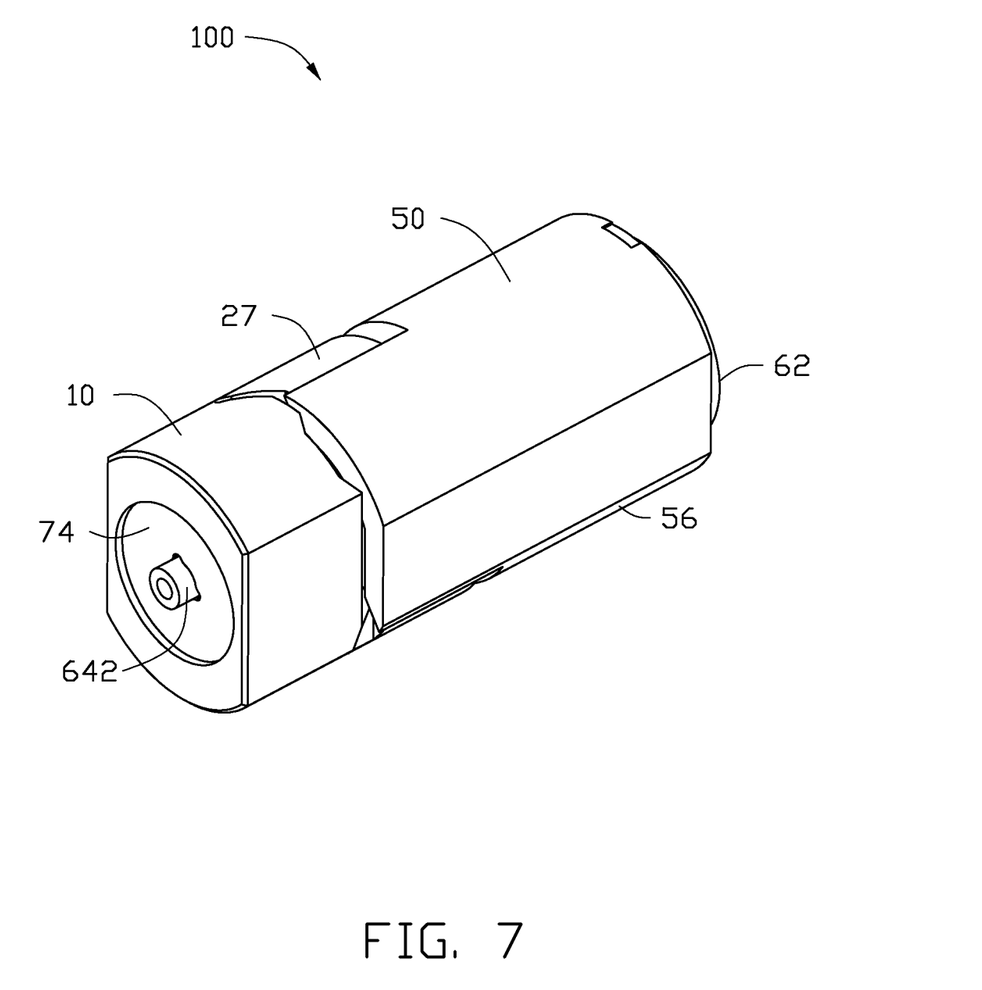
FIG. 7 is an assembled view of the hinge assembly shown in FIG. 1.

Referring to FIG. 7, the third cam 30 is received in the second cam 20. The blocks 34 are slidably received in the guiding grooves 25 of the second cam 20. The peaks 322 face the engaging cam surface 22. Then, the second resilient member 44, the first resilient member 42, the second cam 20 with the third cam 30 are orderly received in the sleeve 50 from the first end 52. The first washer 72 is received in the receiving groove 544 of the sleeve 50. The main shaft 60 is inserted into the center hole 542 of the sleeve 50 from the second end 54 and extends through the elements in the sleeve 50. The first cam 10 is fitted over the main shaft 60, and the inner, outer cam surfaces 12, 14 engage with the second, third cams 20, 30. The first resilient member 42 abuts against the third cam 30 and the second resilient member 44 abuts against the second cam 20. The projections 27 are received in the guiding slots 524. The second washer 74 is latched on the latching portion 642, and is received in the recess 19 of the first cam 10. Thus, the hinge assembly 100 is integrated into a complete unit.

The hinge assembly 100 is used to interconnect a main body and a cover of the mobile phone. The first cam 10 non-rotatably engages the main body, and the sleeve 50 non-rotatably engages with the cover.

In a closed state of the mobile phone, the second protrusion 24 of the second cam 20 is received in the first notch 18 of the first cam 10. The first protrusion 16 is received in the second notch 26 of the second cam 20. The first, second resilient members 42, 43 have a predetermined compressive force for abutting against the second cam 20 and the third cam 30. The peaks 322 of the third cam 30 abut against the planar portion 142 of the inner cam surface 14.

When a user wants to open the mobile phone, the cover is manually rotated away from the main body, hence the sleeve 50 and the second cam 20 rotate relative to the first cam 10. The third cam 30 is caused to rotate relative to the first cam 10. Since the peaks 322 rotate along the planar portions 142 of the inner cam surface 14, the first resilient member 42 cannot be compressed. The movement of the second cam 20 causes the second resilient member 44 to be compressed until the peaks 222 of the second cam 20 slide along the outer planner portions 126 of the outer cam surface 12. At that time, the peaks 322 are retained on the inner planar portions 142. When the cover is released, the second cam 20 may be adjusted and be retained on any position of the outer planner portions 126 relative to the first cam 10. In this exemplary embodiment, the free stop angle of the cover is about 120 degrees. When the user wants to open the mobile phone to another angle such as 155 degrees, the cover needs to be manually rotated away from the main body passed 120 degrees. The peaks 222 slide in the valleys 124 and the peaks 322 of the third cam 30 slide to the grooves 144 of the first cam 10.

When the cover is opened to 180 degrees, the peaks 322 of the third cam 30 slide out of the grooves 144 and are retained on the planar portion 144. The peaks 222 of the second cam 20 slide to an original position. The first notch 18 is opposite to the second notch 26, and the first protrusion 16 abuts against the second protrusion 24. Thus, the cover is rotated to a fully open state. The process of closing the cover is reverse to the process of opening the cover.

The hinge torque curve of the hinge assembly can be composed by at least two torque curves such as the first torque curve and the second torque curve and each torque curve is produced by two cam member. In addition, the free stop hinge assembly may be retained to open states in a range. Furthermore, the first protrusion 16 abuts against the second protrusion 24 to realize a non-clearance engagement between the first cam 10 and the second cam 20 in a fully open state. This structure avoids the swaying of the hinge assembly 100 in a fully open state.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A hinge assembly comprising:
   a first cam including an outer cam surface and an inner cam surface;
   a second cam defining a passage and including an engaging cam surface contacting with the outer cam surface;
   a third cam slidably received in the passage of the second cam, the third cam including a latching cam surface, the latching cam surface passing through the passage and engaging the inner cam surface;
   a first resilient member providing an elastic force making the third cam abut against the first cam;
   a second resilient member having a larger diameter than the first resilient member and receiving the first resilient member therein, the second resilient member making the second cam abut against the first cam; and
   a shaft extending through the first cam, the second cam, the third cam and the first resilient member and the second resilient member.

2. The hinge assembly as claimed in claim 1, wherein two guiding grooves are radially defined in the second cam and communicate with the passage, the third cam includes a main body and two blocks radially extending from the main body, the latching cam surface is formed on one end of the main body, the main body of the third cam is received in the passage, and two blocks are received in the guiding grooves.

3. The hinge assembly as claimed in claim 1, wherein the outer cam surface includes two peaks, two valleys and two outer planar portions, and the inner cam surface includes two symmetrical grooves and two inner planar portions.

4. The hinge assembly as claimed in claim 3, wherein a first protrusion is formed at one side of one peak, and a first notch is defined at one side of the other peak.

5. The hinge assembly as claimed in claim 3, wherein the engaging, cam surface includes two symmetrical peaks and two connecting surfaces, and a second protrusion is formed at one side of one peak, and a second notch is defined at one side of the other peak.

6. The hinge assembly as claimed in claim 1, wherein the main shaft includes a head portion and a shaft portion, the shaft portion extends from one end of the head portion and has a smaller diameter than the diameter of the head portion.

7. The hinge assembly as claimed in claim 1, further comprising a sleeve, the second cam, the third cam, the first resilient member and the second resilient member are received in the sleeve.

8. A foldable electronic device having at least two components hinged together by a hinge assembly, the hinge assembly comprising:
  a first cam including an outer cam surface and an inner cam surface, the first cam engaging with one of the components;
  a second cam engaging with the other of the components, the second cam defining a passage and including an engaging cam surface contacting with the outer cam surface;
  a third cam slidably received in the passage of the second cam, the third cam including a latching cam surface, the latching cam surface passing through the passage and engaging the inner cam surface;
  a first resilient member providing an elastic force making the third cam abut against the first cam;
  a second resilient member having a larger diameter than the first resilient member and receiving the first resilient member therein, the second resilient member making the second cam abut against the first cam; and
  a shaft extending through the first cam, the second cam, the third cam and the first resilient member and the second resilient member.

9. The foldable electronic, device as claimed in claim 8, further comprising a sleeve, the second cam, the third cam, the first resilient member and the second resilient member are received in the sleeve.

10. The foldable electronic device as claimed in claim 8, wherein two guiding grooves are radially defined in the second cam and communicate with the passage, the third cam includes a main body and two blocks radially extending from the main body, the latching cam surface is formed on one end of the main body, the main body of the third cam is received in the passage, and two blocks are received in the guiding grooves.

* * * * *